A. C. LINDGREN & W. J. COOK.
MANURE SPREADER.
APPLICATION FILED APR. 15, 1912.

1,117,870.

Patented Nov. 17, 1914.
7 SHEETS—SHEET 1.

Attest:

Inventors:
Alexus C. Lindgren
Willard J. Cook
by Rogers, Kennedy, Campbell Attys.

A. C. LINDGREN & W. J. COOK.
MANURE SPREADER.
APPLICATION FILED APR. 15, 1912.

1,117,870.

Patented Nov. 17, 1914.
7 SHEETS—SHEET 3.

Fig. 3.

Attest:

Inventors
Alexus C. Lindgren
Willard J. Cook
By Rogers Kennedy
Campbell
Attys.

A. C. LINDGREN & W. J. COOK.
MANURE SPREADER.
APPLICATION FILED APR. 15, 1912.

1,117,870.

Patented Nov. 17, 1914.
7 SHEETS—SHEET 4.

Fig. 4.

UNITED STATES PATENT OFFICE.

ALEXUS C. LINDGREN AND WILLARD J. COOK, OF MOLINE, ILLINOIS, ASSIGNORS TO MOLINE PLOW COMPANY, A CORPORATION OF ILLINOIS.

MANURE-SPREADER.

1,117,870.   Specification of Letters Patent.   Patented Nov. 17, 1914.

Application filed April 15, 1912. Serial No. 690,745.

*To all whom it may concern:*

Be it known that we, ALEXUS C. LINDGREN and WILLARD J. COOK, citizens of the United States, both residing at Moline, in the county of Rock Island and State of Illinois, have invented certain new and useful Improvements in Manure-Spreaders, of which the following is a specification, reference being had therein to the accompanying drawing.

This invention relates to manure spreaders of the type in which the material is carried in a wagon and supported on a feeding apron mounted in the bottom of the wagon body and acting as the machine travels over the field, to move rearwardly and present the rear portion of the mass of material to the action of a spreading or distributing mechanism, commonly in the form of a toothed cylinder rotating at high speed, the action of which cylinder is to detach portions of the material from the mass and spread the same over the surface of the ground, the feeding apron, after the load has been discharged, being returned to the front of the wagon body ready to receive another load.

In machines of this general type, it is common to provide mechanism for automatically arresting the feeding motion of the apron when all of the load has been distributed, and to provide mechanism for returning the apron to the front of the machine automatically after its advance is arrested, these mechanisms, as well as the mechanism for driving the spreader cylinder, being operated from the ground wheels, and being controlled in their operations by a manually-operated lever within reach of the driver.

In certain forms of machines of this description, the manually-operated lever is fixed to a transverse rock shaft at the front of the machine, connected to the spreader-cylinder driving mechanism through the medium of a main clutch, and to the apron-feeding and returning mechanisms in such manner that when the shaft is rocked in one direction, the spreader-cylinder driving-mechanism and the apron advancing mechanism will be thrown into action, and on the rocking of the shaft in the other direction, these mechanisms will be thrown out of action. The lever controlling these operations is acted on by a spring, so arranged that when the lever is pulled up to connect the said mechanisms, the spring will be placed under tension and a latch will be actuated to hold the lever up, the automatic tripping of the latch by the rearward movement of the apron at the moment when the load has all been delivered, operating to release the lever and allowing the same to be automatically thrown down by the spring, such spring-actuation of the lever, operating to not only disconnect the apron-feeding mechanism, but also to disconnect the spreader-cylinder mechanism.

In the practical use of machines of the above description it has been found, that, by reason of the very considerable amount of work imposed on the spring in disconnecting the apron feed and the spreader-cylinder driving-mechanism, a spring of undue and unwieldly strength is required; and it is found that this spring will frequently fail to perform its function in promptly disconnecting the mechanisms.

Our present invention is designed to overcome these objectionable features as well as to provide for the certain and reliable operation of the clutch controlling the spreader-cylinder mechanism; and the invention consists in combining with manually-operated means for controlling the spreader-cylinder driving-mechanism, a spring-actuated means operating independently of the manual means, and acting to control the apron-driving mechanism.

Our invention consists also in so connecting the manually-operated controlling means with the apron-driving controlling means, that when the manually-operated means is actuated in one direction, it will throw the spreader-cylinder mechanism and the apron-driving mechanism into action, but the apron-feeding mechanism will be permitted to be thrown out of action without disturbing the spreader cylinder mechanism.

The invention consists also in an improved form of clutch operating mechanism designed to effect a positive and certain movement of the clutch member without liability of the parts being accidentally displaced after once being set.

The invention consists also in the details of construction and combination of parts hereinafter described and claimed.

In the accompanying drawings: Fig. 3ª is a fragmentary view showing particularly the form of the operating mechanism for the clutch controlling the spreader mechanism, the clutch being shown disconnected.

Referring to the drawings, 1 represents a wagon body sustained by ground wheels 2, mounted on a rotary axle 3, a pawl and ratchet connection being provided between the wheels and axle to cause the axle to revolve with the wheels in their forward travel, but to permit the wheels to turn back without affecting the axle. Arranged in the bottom of the body is a flexible feeding apron 4, mounted to slide back and forth, the front end of the apron being provided with an upright front board 5, and the rear end of the apron being adapted as the front board 5 moves to the rear, to advance toward the front on the under side of the body. The apron in its slow rearward feeding movement, carries the mass of material supported thereon, rearwardly and presents its rear portion to the action of a spreader cylinder 6, driven at high speed at the rear end of the wagon body, the said cylinder acting to detach portions of the mass and spread the same over the surface of the ground, a pendent swinging rake 7 being sustained in advance of the spreader cylinder and serving to prevent the passage of unduly large lumps to the cylinder and thereby clog the action of the same.

Figure 1:
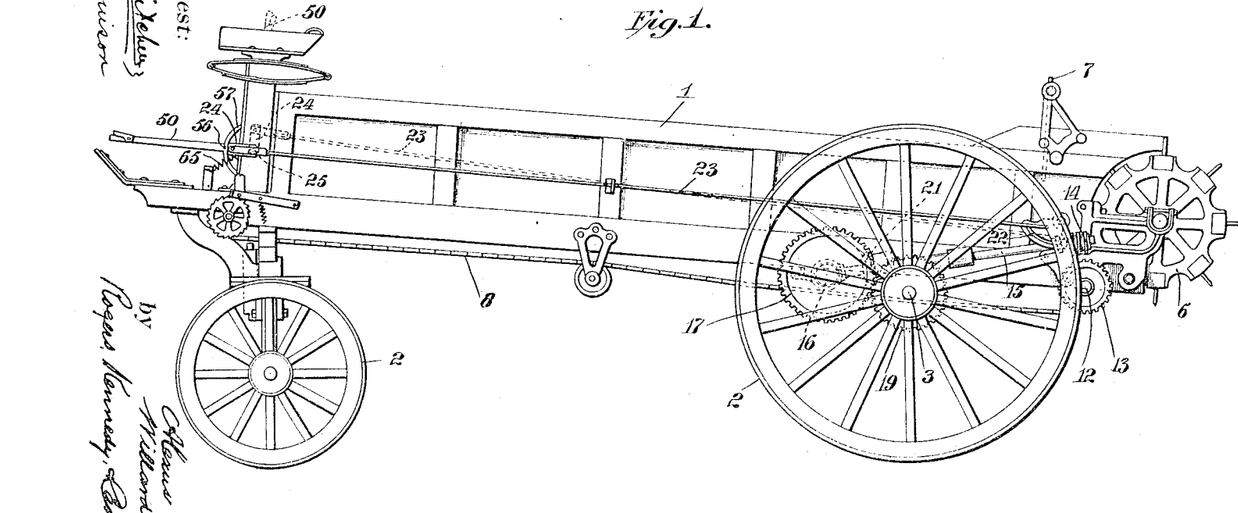
Figure 1 is a side elevation of a manure spreader embodying my invention.

The feeding and return movements of the apron are effected by means of a centrally arranged fore and aft extending endless sprocket chain 8, passing around a vertical sprocket wheel 9, on the inner end of a transverse horizontal shaft 10 at the front of the machine, and around a similar sprocket wheel 11 on the inner end of a horizontal transverse shaft 12 at the rear of the machine, this latter shaft acting to move the apron in its feeding direction, and the other shaft acting to return the empty apron to the front of the machine. The shaft 12 is provided on its outer end with a worm wheel 13, engaged by a worm 14 on the rear end of a worm shaft 15, which extends forwardly at the outer side of the body and has its forward end mounted in a housing pivotally supported on a horizontal transverse shaft 16, mounted in bearings in the wagon body. The shaft 16 is provided at its ends with a spur pinion 17, engaged by a spur pinion 19 on the axle 3, whereby the forward motion of the ground wheels will rotate the shaft 16. The worm shaft 15 is provided with a bevel gear 21, meshing with gear teeth on the face of the pinion 17, by which means a rotary motion will be imparted to the worm shaft from the ground wheels, and will be transmitted to shaft 12 in a direction to drive chain 8 so as to move the apron in its feeding direction rearwardly. By the pivotal support of the rear end of the worm shaft as described, it is adapted to be moved up and down relative to the worm wheel, so that the latter may be engaged or disengaged by the worm shaft in order to control the apron feeding action. The movement of the worm shaft up and down is effected by means of a rocking segment plate 22 (Fig. 1), which is pivoted to the side of the body and provided with an eccentric cam slot engaging a pin on a vertically movable hanger surrounding the worm shaft, the rocking of the plate on its pivot serving to raise and lower the shaft. The plate has connected with it a rod 23, whose forward end is jointed to a crank 24, on one end of a transverse horizontal rock shaft 25, mounted in bearings at the front of the machine, the rocking of the shaft a quarter turn in a forward direction shifting the segment plate forwardly and lifting the worm from the worm wheel, and the rocking of the shaft in the opposite direction lowering the worm into engagement with the worm wheel, by which action the apron feeding mechanism will be respectively disconnected and connected. As will be presently described, the operation of the rock shaft 25 is effected in one direction manually to connect the apron feeding mechanism, and is effected in the opposite direction to disconnect the apron feeding mechanism, by spring power initiated automatically when the apron arrives at the limit of its feeding movement in discharging the load.

The shaft 10 before alluded to, at the front of the machine, for returning the empty apron, is driven by a longitudinally extending shaft 26, mounted in bearings in the under side of the body, which shaft is driven from the axle by means of a bevel pinion 28 thereon, meshing with a bevel pinion 29 on the rear end of the shaft. At its forward end the shaft 26 is provided with a bevel pinion 30, in position to be engaged by a bevel pinion 31, splined to the shaft 10 so that the pinion 31 may be engaged with pinion 30 when shaft 10 is to be rotated to effect the return of the apron, and may be disengaged from pinion 30 to permit shaft 10 to rotate idly in the feeding movement of the apron, these movements of pinion 31 being effected by a vertical laterally acting shifter bar 32, provided with a fork 32ª, engaging in a groove in the hub of pinion 31, as will be more fully described hereinafter. Pinion 31 is acted on by a spiral spring 33, encircling shaft 10 and bearing at one end against a collar 34, fixed to the shaft, and at its opposite end against the face of the pinion, the tendency of the spring being to shift pinion 31 out of mesh with pinion 30. When the gears are in mesh, with the apron-returning mechanism in operation, they are held engaged with each other against the action of the spring, but on being released, which is effected automatically by the forward movement of the empty apron, as will be presently described, spring 33 will act to shift pinion 31 and disconnect shaft 26 from shaft 10, and the empty apron will come to rest in position ready to receive another load.

The spreader cylinder 6 before alluded to, is driven by means of a sprocket chain 35 passing over a sprocket wheel 36, geared to the cylinder, and over a large sprocket 37, running loosely and slidable laterally on the axle 3, the hub of said wheel being provided in its outer side with clutch teeth 38, adapted to be engaged with clutch teeth on the hub of one of the ground wheels 2, the arrangement being such that sprocket wheel 37 may be shifted outwardly to engage the clutch teeth on the ground wheel, or it may be shifted in the opposite direction to disengage said teeth. When the clutch teeth are engaged, the motion of the ground wheels will be imparted to the spreader cylinder and it will be rotated with its inner side moving upwardly, and when the clutch teeth are disengaged, the spreader cylinder will remain at rest. In order that the sliding member of the clutch, that is the sprocket wheel 37, may be operated conveniently and with certainty, and in order that when shifted to either position, it will be held without risk of accidental displacement. We have designed an improved clutch-operating mechanism which constitutes one of the features of our invention. This mechanism comprises a longitudinally extending horizontal bar 39, pivoted at its front end on a vertical axis 40, to the under side of the wagon body, and having at its rear end a vertically arranged fork 41, engaging in a peripheral groove in the hub of the shiftable sprocket wheel. Mounted on this bar is a sliding block 42, having pivoted to it on a vertical axis, the outer end of a horizontal link 43, extending transversely toward the center of the body where its inner end is pivoted to the body on a vertical axis, as at 44, the construction being such that when the sliding block is drawn forwardly from the position shown in Fig. 3ª, it will swing the bar outwardly and connect the clutch, and when the block is moved back, it will swing the bar inwardly and disconnect the clutch, these movements of the bar being thus transverse to the movement of the block and being due to the movements of the block about a center coincident with the pivotal axis of the link. As a result, the lateral or swinging movements of the bar will be effected with ease and certainty, and the sliding member of the clutch being once positioned, any force exerted on it at the axle and tending to displace it, will be exerted in a direction endwise of the link and will, therefore, have no tendency to swing the link.

Figures 2, 3A:
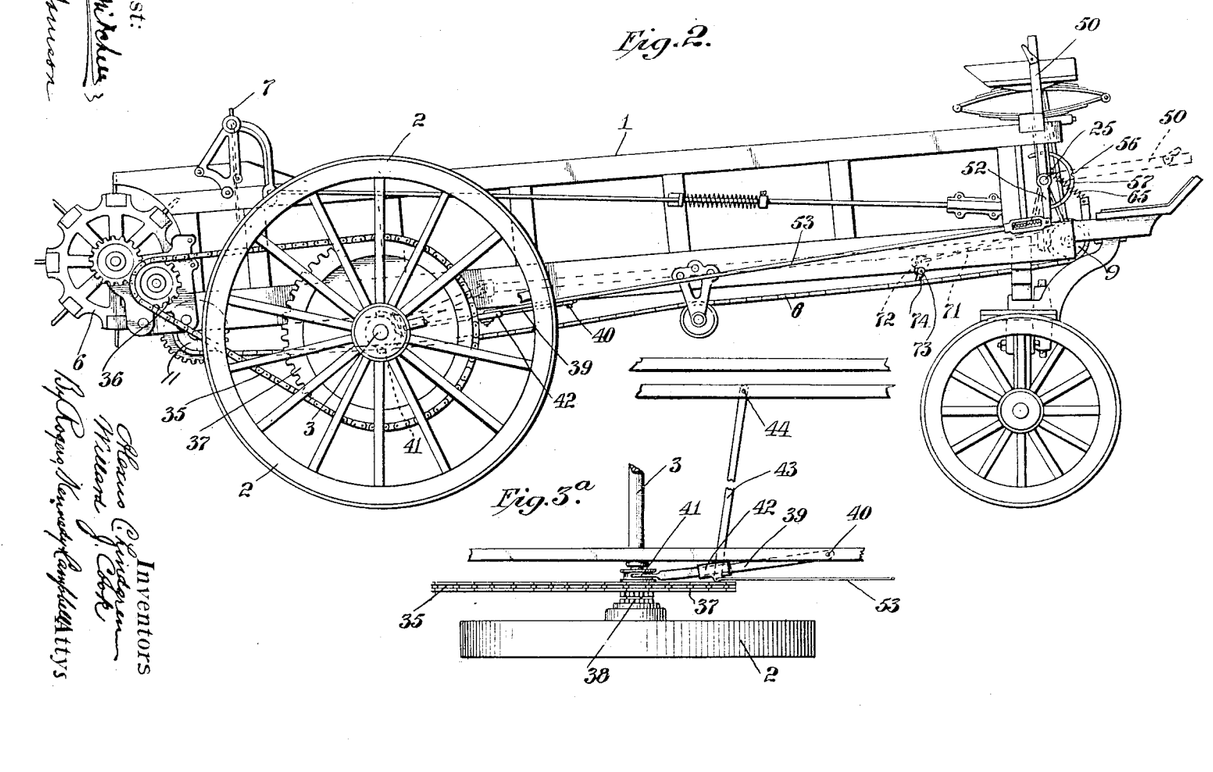
Fig. 2 is a similar view from the opposite side of the machine.
Figure 3:
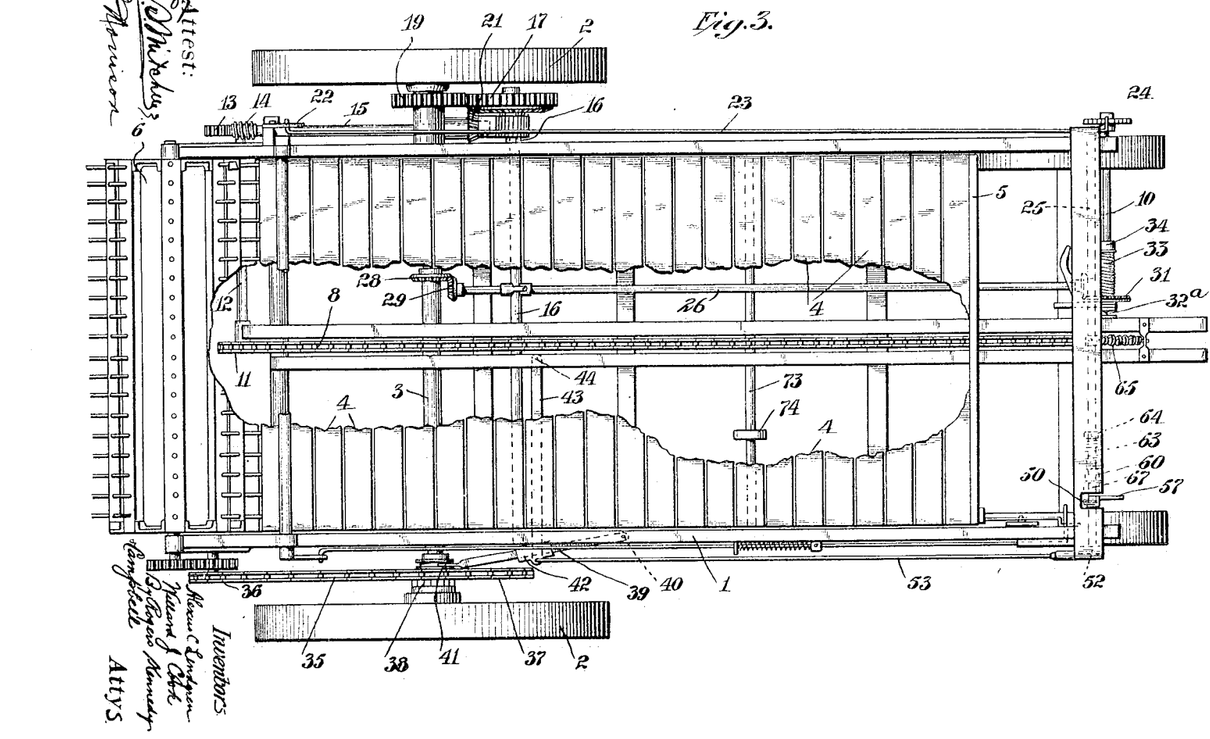
Fig. 3 is a top plan view of the machine with portions broken away to expose other parts.

The sliding block 42 is operated to control the clutch by means of a manually-operated lever 50, provided with a laterally extending tubular sleeve 51, loosely encircling the rock shaft 25, a crank arm 52 being fixed to the end of the sleeve and being connected to the sliding block by means of a rod 53, jointed at its froward end to the crank arm, and jointed at its rear end to the block. When the lever 50 is in a vertical position, as shown in Fig. 2, the crank arm 52 will extend downwardly vertically, and the clutch-operating bar 39 will be in its outer position with the clutch engaged, as shown in Fig. 3. When, however, the hand lever is thrown forwardly and downwardly to a horizontal position, as indicated in dotted lines in Fig. 2, the clutch-operating lever will be swung to its inner position and the clutch will be disengaged, as shown in Fig. 3ª, the lever being adapted to be locked in either of these positions by means of a locking dog 54, carried by the lever and adapted to engage in either of two notches 55 and 56 in a segment frame 57, fixed to the wagon body at the side of the lever.

Figures 5, 7:
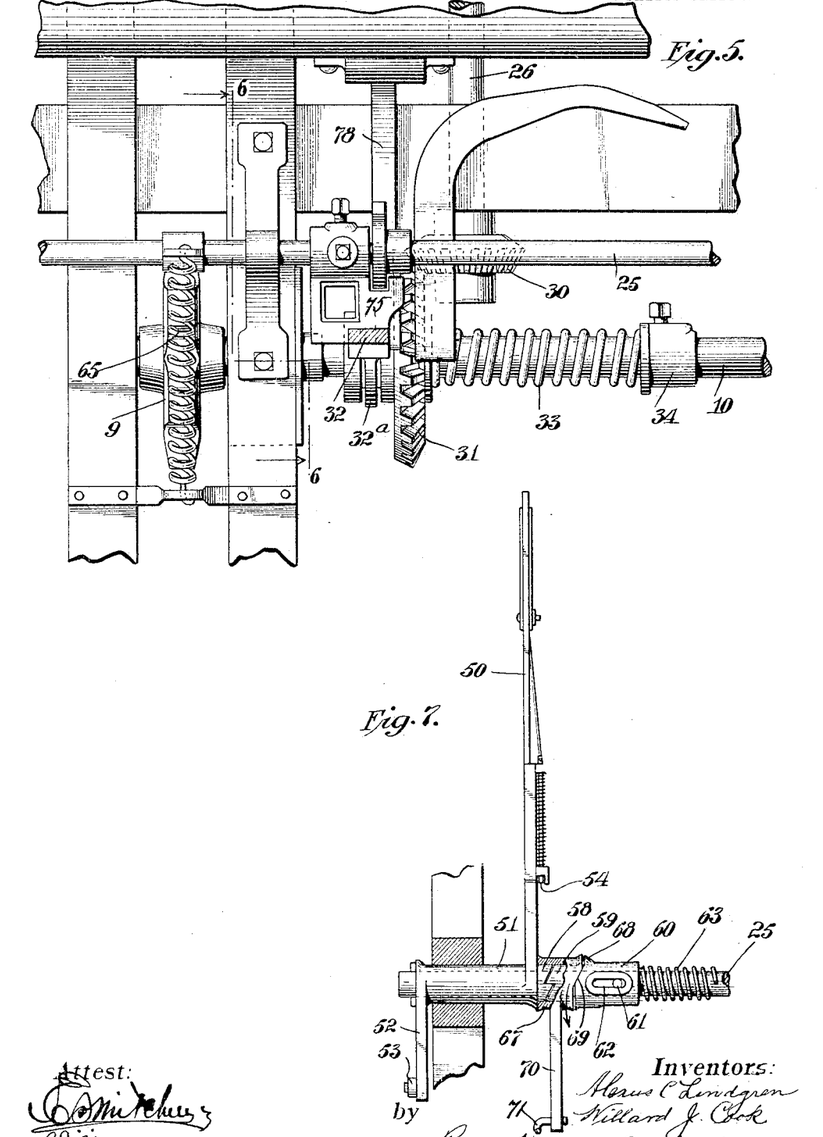
Fig. 5 is an enlarged transverse sectional plan view on the line 5—5 of Fig. 4.
Fig. 7 is a front elevation on an enlarged scale and with parts broken away, of the manually-operated controlling lever and the parts immediately associated therewith.
Figure 6:
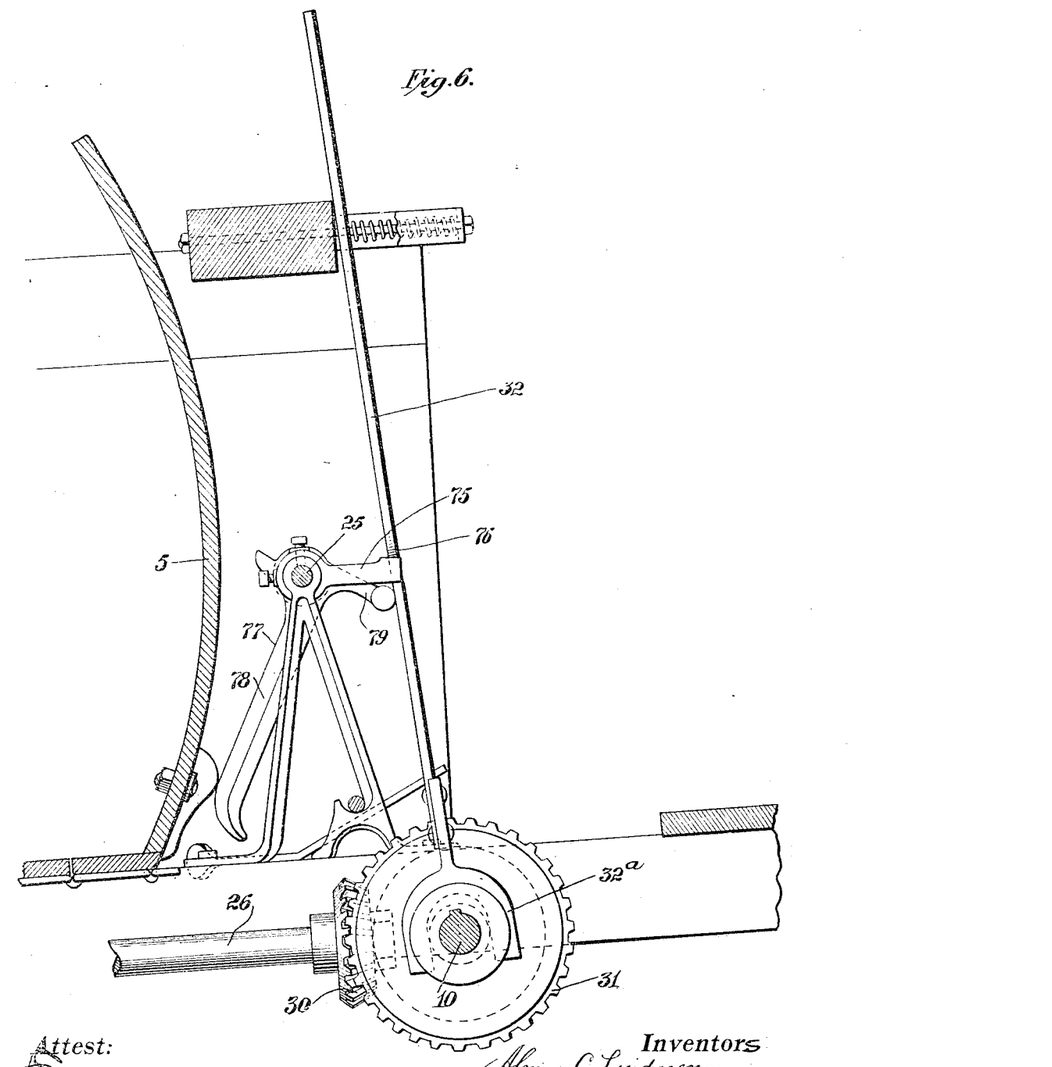
Fig. 6 is an enlarged longitudinal sectional elevation on the line 6—6 of Figs. 4 and 5.
Figure 8:
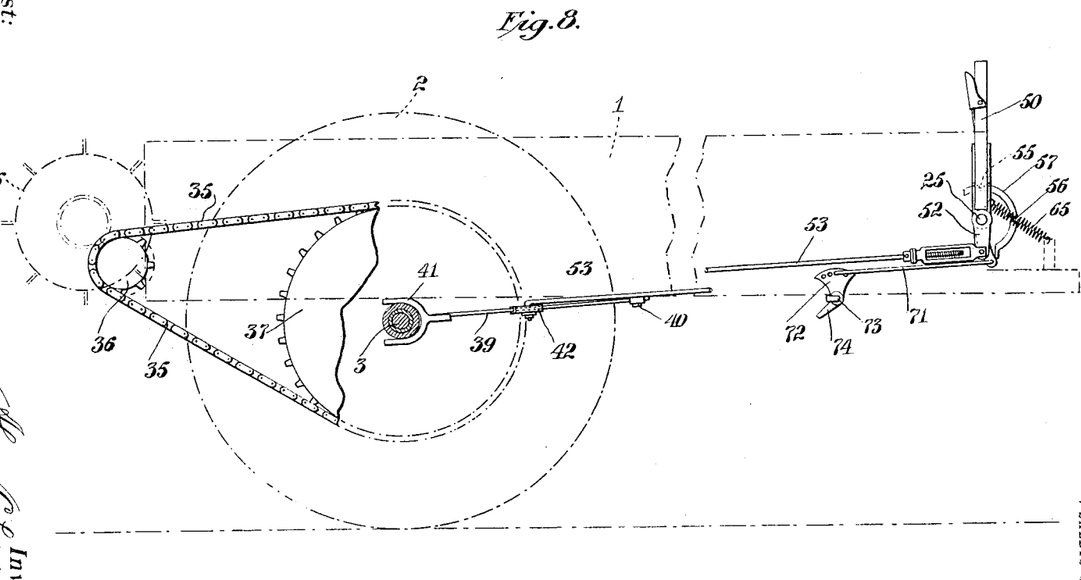
Fig. 8 is a side elevation showing the form of spreader-cylinder driving-mechanism and the devices for controlling the same.

The hand lever 50 is adapted to coöperate with the rock shaft 25 and the parts operated thereby, in such manner that the operation of the lever in one direction will actuate the rock shaft and will connect the apron-feeding mechanism and spreader cylinder clutch. The rock shaft will be capable, nevertheless, of a movement independently of the hand lever, to disconnect the apron-feeding mechanism without affecting the clutch. To effect these operations the sleeve 51 is provided on its end at the side of the lever opposite the crank arm, with a number of clutch teeth 58, which are adapted to coöperate with corresponding teeth 59 on the end of a collar 60, which encircles the shaft and is slidingly connected thereto by means of a pin 61 on the shaft, engaging a longitudinal slot 62 in the collar, a spring 63 encircling the shaft and bearing at one end against a shoulder 64, fixed to the shaft, and at its other end against the end of the collar, and tending to force the latter laterally into engagement with the toothed sleeve of the lever, as shown in Fig. 7. The coöperating teeth on the collar and sleeve are formed with inclined surfaces and with abrupt or straight faces, and are so related that when the hand lever 50 is pulled rearwardly, the abrupt faces of the coöperating teeth will engage each other, and by reason of the sliding connection of the collar with the shaft, the latter will be rotated with the lever. The coöperating teeth thus arranged, form in effect a connection between the shaft and the lever, which connection is adapted to be operated to release the shaft, in order to permit the latter to be rocked without disturbing the position of the lever. The rocking of the shaft thus independently of the lever is effected by means of a spring 65 connected at its upper end with an arm 66 on the shaft, and connected at its lower end with the frame of the machine, the said spring being adapted when the shaft is rocked rearwardly, to be placed under tension, so that on the release of the shaft the spring will instantly rock the shaft in the opposite direction. It will be remembered that this forward rocking of the shaft acts, through the medium of the crank arm 24 on the end thereof, to lift the worm shaft at the rear of the machine and disconnect the apron-feeding mechanism, this action of the shaft being initiated automatically, by the rear end of the apron when the latter arrives at the limit of its feeding movement, and all the load has been discharged. In order that the rock shaft may be released from the hand lever 50 to permit the spring actuation of the shaft as described, and in order that the releasing means may be controlled automatically by the movement of the apron, the toothed ends of the sleeve and collar are loosely encircled by a bushing 67, as shown more particularly in Fig. 7, one end of which is adapted to engage an annular shoulder just back of the teeth on the sleeve, while the other end is provided with an inclined or cammed face 68, adapted in the movements of the bushing, to coöperate with a similarly formed face 69 on the collar, the relation of these parts being such that when the bushing is rotated in the direction indicated by the arrow in Fig. 7, these cam faces coming into action will cause the collar to be shifted longitudinally on the shaft until the teeth thereon are disengaged from those on the sleeve, this action releasing the shaft from the lever and permitting the spring to act on the shaft and rock the same forwardly and downwardly, as before mentioned. The bushing is provided with a depending arm 70, having connected with it the forward end of a rod 71, whose rear end is jointed to the upper end of an arm 72, fixed at its lower end to a horizontal transverse rock shaft 73, mounted in bearings on the wagon body, to which shaft is connected a depending arm 74, extending in the path of movement of the forward end of the apron, as this end travels forwardly in the feeding motion of the apron. The relation of the parts is such that by the time the apron has completed its full feeding movement and all the material has been distributed, the rear end of the apron traveling forwardly will encounter the arm 74, and moving said arm forwardly, the shaft will be rocked rearwardly, which through the medium of the connecting rod 71, will rotate the bushing in the direction of the arrow in Fig. 7, this action shifting the toothed collar endwise, and freeing the shaft connected with said collar from the locked lever 50. Immediately on the release of the shaft, the spring 65 will rock the same in a forward and downward direction, and this action will, through the medium of crank 24 and the connections therefrom to the worm shaft, lift the worm from the worm wheel and disconnect the apron feeding mechanism.

From the foregoing description, it will be seen that the only work that spring 65 has imposed upon it, is the disconnection of the apron-feeding mechanism, the disconnection of the main or spreader clutch being effected manually and positively by the forward throw of the lever 50 while the apron-feeding mechanism is disconnected. Therefore, it will not be necessary to employ a spring of undue strength, with the result that correspondingly less effort will be required to place the same under tension. Further, it will be seen that on the automatic release of the shaft by the apron, the spring-actuation of the shaft in disconnecting the apron-feeding mechanism is effected independently of the hand lever, it being necessary in order to again connect the apron-feeding mechanism, to first throw the hand lever downwardly and then pull it back and lock it in vertical position.

The connection of the apron-returning mechanism is effected at the moment that the apron-feeding mechanism is thrown out of gear, and by the lateral movements of the shifter bar 32 before alluded to. The lateral movement of this member is effected by means of an arm 75 which is fixed to the rock shaft 25 and is provided in its end with a notch, embracing the shifter member 32, the latter being provided with a cam surface 76, with which the sides of the notch coöperate in such manner that when the shaft 25 is rocked downwardly by the spring, the shifter member will be moved by the arm 75 laterally to the right, in Fig.

Figure 4:
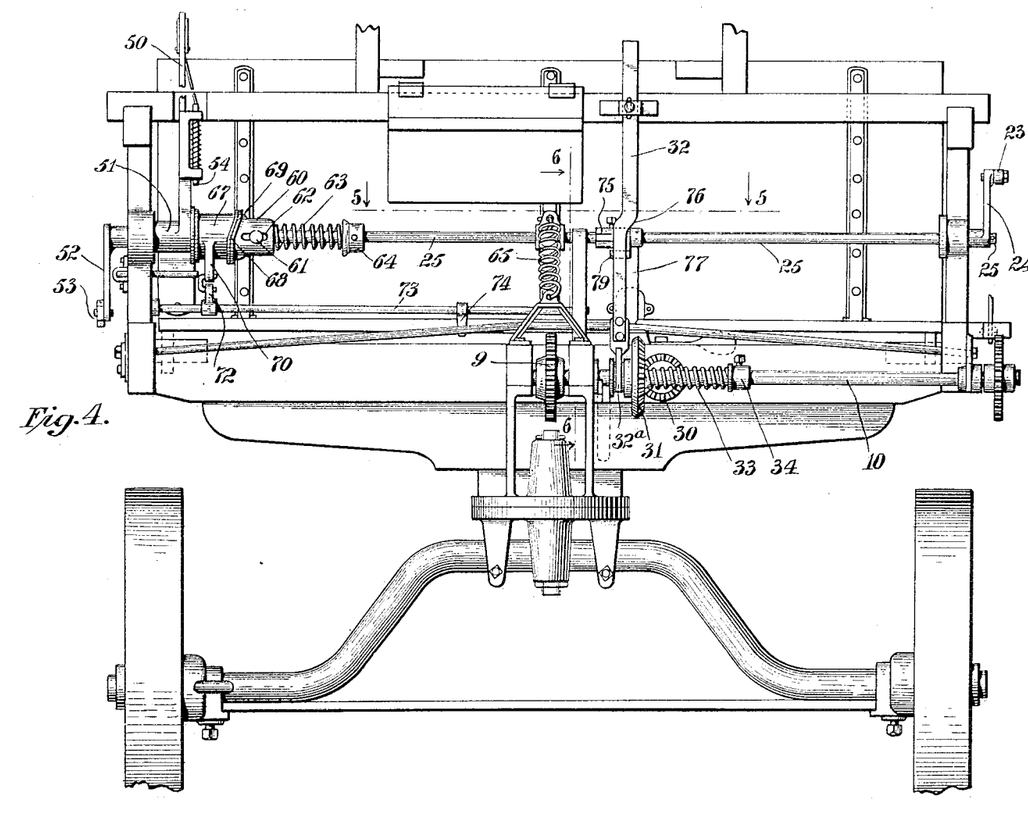
Fig. 4 is a front elevation of the machine.

4, thereby shifting bevel gear 31 into mesh with bevel gear 30, these gears being held in engagement by the engagement of the shifter member in the notch in the arm 75. With the gears engaged, the empty apron will be moved forwardly, and in order that when the same arrives at its forward normal position the returning mechanism may be thrown out of gear we provide a tripping device consisting of an angular lever 77, which is mounted loosely on the shaft 25 adjacent the arm 75, and is provided with a long depending arm 78, and a short forwardly extending finger 79, the arm being extended in the path of the front board of the apron, so that when the latter reaches its forward position, it will encounter the arm, and rocking the same on shaft 25, the finger will be moved upwardly and forwardly and will engage behind the shifter member and positively disengage the same from the notch in the arm 75, the said shifter member being so mounted that it may, in addition to its lateral swinging movement, also be moved forwardly. On the disengagement of the shifter member from the notch in the arm, the spring 33 will shift bevel gear 31 out of mesh with bevel gear 30, and the empty apron will come to rest ready to receive another load of material.

In the operation of the mechanism, the body being loaded and the various operative mechanisms being disconnected, with the hand lever 50 in its forward horizontal position, the main clutch disconnected and the worm lifted from engagement with the worm wheel, and finally, the spring 65 relaxed, the driver drives to the locality where the material is to be distributed, and to throw the machine into action he pulls lever 50 rearwardly to a vertical position and locks it there by means of the locking latch. This action, due to the engagement of the clutch teeth on the lever and on the collar, and due to the connection of the collar with shaft 25, will rock the shaft a quarter turn rearwardly, thereby placing the spring 65 under tension and at the same time shifting the clutch operating bar 39 outwardly, with the result that the apron-feeding mechanism will be thrown into action and the spreader cylinder will be rotated. Simultaneously with this action, the worm is lowered into engagement with the worm wheel, and the apron starts its feeding movement. The distribution of the material now proceeds, and by the time the entire load has been distributed, the rear end of the apron in traveling forwardly, will rock arm 74, thereby rocking bushing 67, and collar 60 being shifted on the shaft endwise, its teeth will be disengaged from those on the hand lever, and the shaft being released, spring 65 will instantly turn the same forwardly and downwardly a quarter turn, the hand lever in the meantime remaining in its vertical position with the main clutch connected, and the spreader operating. By the movement of the rock shaft under the influence of the spring, the worm is lifted from engagement with the worm wheel, and the apron-feeding mechanism is disconnected. Simultaneously with this action, arm 75 on the rock shaft will shift the shifter member 32 laterally and engage bevel pinion 31 with bevel pinion 30, thereby throwing into action the apron-returning mechanism. The empty apron will now return to the front of the machine and at the completion of its forward motion the front board will encounter the rocker device, and actuating the same, the shifter member will be released from the arm 75 automatically, and spring 33 will shift pinion 31 out of engagement with pinion 30, and the apron will come to rest. The operator now unlocks lever 50 and throws the same forward, thereby arresting the motion of the spreader and the machine is now ready to receive another load.

If for any reason the driver wishes to manually disconnect the spreader cylinder mechanism and the apron-feeding mechanism, before the apron completes its feed this he may do by unlocking lever 50 and allowing the spring 65 to shift the shaft and lever forwardly.

While we have in the foregoing description and accompanying drawings, disclosed a certain detailed form of mechanism for driving the spreader cylinder; for feeding the apron; for returning the empty apron and automatically arresting its return movement; it will be understood that these mechanisms in themselves form no part of the present invention, and, therefore, they may be variously modified and changed, provided that they will coöperate with our improved mechanism in effecting the operations described. In other words, our invention is concerned with the manually-operated lever and its coöperative relation to the spring-actuated controlling devices, and therefore our invention is applicable to any form of apron drive or apron-returning mechanism, provided that they may be controlled by our improved mechanism in the manner described.

Having thus described our invention, what we claim is:

1. In a manure spreader, the combination of a spreader, a driving mechanism therefor adapted to be thrown into and out of gear, a traveling apron, a feeding mechanism therefor adapted to be thrown into and out of gear, a rock shaft, controlling means for the apron-feeding mechanism permanently connected with the rock shaft to be positively actuated thereby in throwing the apron driving mechanism out of gear, a manually-operated lever adapted to be moved independently of the rock shaft to throw out the spreader gear, and means for connecting the lever with the shaft to enable both driving mechanisms to be thrown into gear together.

2. In a manure spreader, the combination of a spreader, a driving mechanism therefor adapted to be thrown into and out of gear, a traveling apron, a feeding mechanism therefor adapted to be thrown into and out of gear, a rock shaft, controlling means for the apron-feeding mechanism permanently connected with the rock shaft to be positively operated thereby to throw the apron driving mechanism out of gear, a manually-operated lever for controlling the spreader driving-mechanism, said lever being adapted to be operated in one direction independently of the shaft to throw the spreader driving mechanism out of gear, and connecting means between the shaft and lever adapted when the lever is operated in the other direction to rock the shaft and throw both mechanisms into gear.

3. In a manure spreader, the combination of a spreader, a driving mechanism therefor, a controlling means for the spreader driving-mechanism, a traveling apron, a feeding mechanism therefor, a controlling means for the same, a power-actuated shaft connected with the controlling means for the apron-feeding mechanism to actuate the same, a releasable connection between the shaft and controlling means for the spreader driving-mechanism, and means operated automatically by the apron to release said connection to permit the shaft to be operated by the power and independently of the lever.

4. In a manure spreader, the combination of a spreader, a driving mechanism therefor, a lever controlling said driving mechanism, a traveling apron, a feeding mechanism therefor, means for controlling said feeding mechanism, a power-actuated rock shaft connected with said latter controlling means, a connection between the shaft and the lever to permit said parts to be operated together, and means controlled by the apron for disconnecting the shaft from the lever to permit independent power-actuation of the shaft.

5. In a manure spreader, the combination of a spreader, a driving mechanism therefor, a traveling apron, a feeding mechanism for the same, a controlling means for the apron-feeding mechanism, a rock shaft connected with said controlling means, a hand lever mounted loosely on the rock shaft and adapted to control the spreader driving mechanism, clutch teeth on the lever, a collar rotatable with the shaft and movable longitudinally thereof, and provided with clutch teeth coöperating with those on the lever, a spring acting to hold the teeth interlocked, a spring acting on the shaft and adapted to be placed under tension when the shaft is moved in one direction, means for locking the lever in position to hold the shaft with the spring tension, and a rocking member adapted to shift the collar longitudinally to disengage its teeth from those on the shaft, whereby on the disconnection of the teeth, the spring will rock the shaft independently of the lever and actuate the controlling means for the apron-feeding mechanism.

6. In a manure spreader the combination of a spreader device, a traveling feeding apron, a power shaft adapted to throw the apron feed out of gear, a manually operated lever movable relatively to the power shaft and adapted to throw the spreader device out of gear, and coöperating connections between the lever and shaft formed to effect a manual operation of the shaft to throw the apron feed and the spreader device into gear, and permitting the shaft to be power-operated relatively to said lever to throw the apron feed out of gear.

7. In a manure spreader the combination of a spreader device, driving mechanism therefor, controlling means for said mechanism, a manually operated device adapted to actuate said controlling means to throw the spreader device out of action, a traveling apron, driving mechanism therefor, controlling means for said driving mechanism, a rock shaft actuated in one direction by power and acting when so operated to actuate the apron-driving controlling means and throw the apron out of action, and acting when operated in the other direction to actuate the said controlling means to throw the apron into action, the said manually operated device being so connected with the rock shaft that the rock shaft will be manually operated to connect the apron drive when the spreader drive is connected, but may be power operated to disconnect the apron drive independently of the spreader drive.

8. In a manure spreader the combination of a spreader, a driving mechanism therefor, a traveling apron, a feed mechanism therefor, a controlling means for the apron feed mechanism, a rock shaft connected with said controlling means, a hand lever mounted loosely on the rock shaft and adapted to control the spreader driving mechanism, a collar rotatable with the shaft, said lever and collar being movable relatively to each other and being provided with interlocking teeth, a member engaging the collar and lever to move them relatively to disengage the teeth, and means for operating said member; whereby with the teeth interlocked the lever and shaft may be operated in unison to throw both mechanisms into action, and with the teeth disengaged the shaft may be operated independently of the lever to throw the apron driving mechanism out of action.

In testimony whereof we affix our signatures in presence of two witnesses.

ALEXUS C. LINDGREN.
WILLARD J. COOK.

Witnesses:
T. C. BLANDING,
JAMES J. LAMB.